United States Patent [19]

Propst et al.

[11] 4,372,629

[45] Feb. 8, 1983

[54] COMBINATION WIRE ENCLOSURE AND WIRE

[75] Inventors: Paul L. Propst, Holland; Donald A. Richardson, Kentwood; Carl B. Hinrichs, Grand Haven, all of Mich.

[73] Assignee: Stow/Davis Furniture Company, Grand Rapids, Mich.

[21] Appl. No.: 205,684

[22] Filed: Nov. 10, 1980

[51] Int. Cl.³ .................... A47B 17/00; A47B 96/18
[52] U.S. Cl. .................... 312/223; 312/194; 312/196; 49/489; 248/52
[58] Field of Search ............... 312/223, 194, 195, 196, 312/296; 49/489, 466; 248/51, 52

[56] References Cited

U.S. PATENT DOCUMENTS

| | | | |
|---|---|---|---|
| 1,350,658 | 8/1920 | Lawrence | 52/221 |
| 1,582,689 | 4/1926 | Reeves | 49/489 |
| 1,689,414 | 10/1928 | Trammell | 312/223 |
| 1,905,402 | 4/1933 | Sink | 312/223 |
| 1,999,157 | 4/1935 | Rand | 312/194 |
| 2,599,183 | 6/1952 | Kessler | 49/489 |
| 2,695,762 | 11/1954 | Wersching | 248/51 |
| 2,778,417 | 1/1957 | Novitz | 160/181 |
| 2,799,063 | 7/1957 | Miller | 49/489 |
| 2,987,362 | 6/1961 | Bernath | 312/195 |
| 3,077,250 | 2/1963 | Goldberg | 49/489 |
| 3,420,002 | 1/1969 | Kondolf | 49/489 |
| 3,783,175 | 1/1974 | Timmons et al. | 312/223 |
| 3,836,421 | 9/1974 | Terry, Jr. et al. | 49/489 |
| 3,883,202 | 5/1975 | Konig | 312/223 |
| 4,037,378 | 7/1977 | Collins et al. | 52/397 |
| 4,053,701 | 10/1977 | Ogilvie et al. | 312/223 |
| 4,094,561 | 6/1978 | Wolff et al. | 312/223 |
| 4,163,867 | 8/1979 | Breidenbach | 312/223 |
| 4,195,681 | 4/1980 | Douglas et al. | 160/371 |

Primary Examiner—Victor N. Sakran
Attorney, Agent, or Firm—Price, Heneveld, Huizenga & Cooper

[57] ABSTRACT

A wire enclosure is disclosed having a wire raceway, a slot communicating with the raceway, and a cover for covering the slot. In one embodiment, the cover is hingedly mounted to one side of the slot and has a flexible seal to seal the cover against the other side of the slot when the cover is closed. Electrical outlets are mounted on the underside of the hinged cover so that the outlets are hidden when the cover is closed and easily accessible when the cover is open. In an alternative embodiment, the cover is a brush, mounted on one side of the slot, extending towards and engaging the other side of the slot.

13 Claims, 6 Drawing Figures

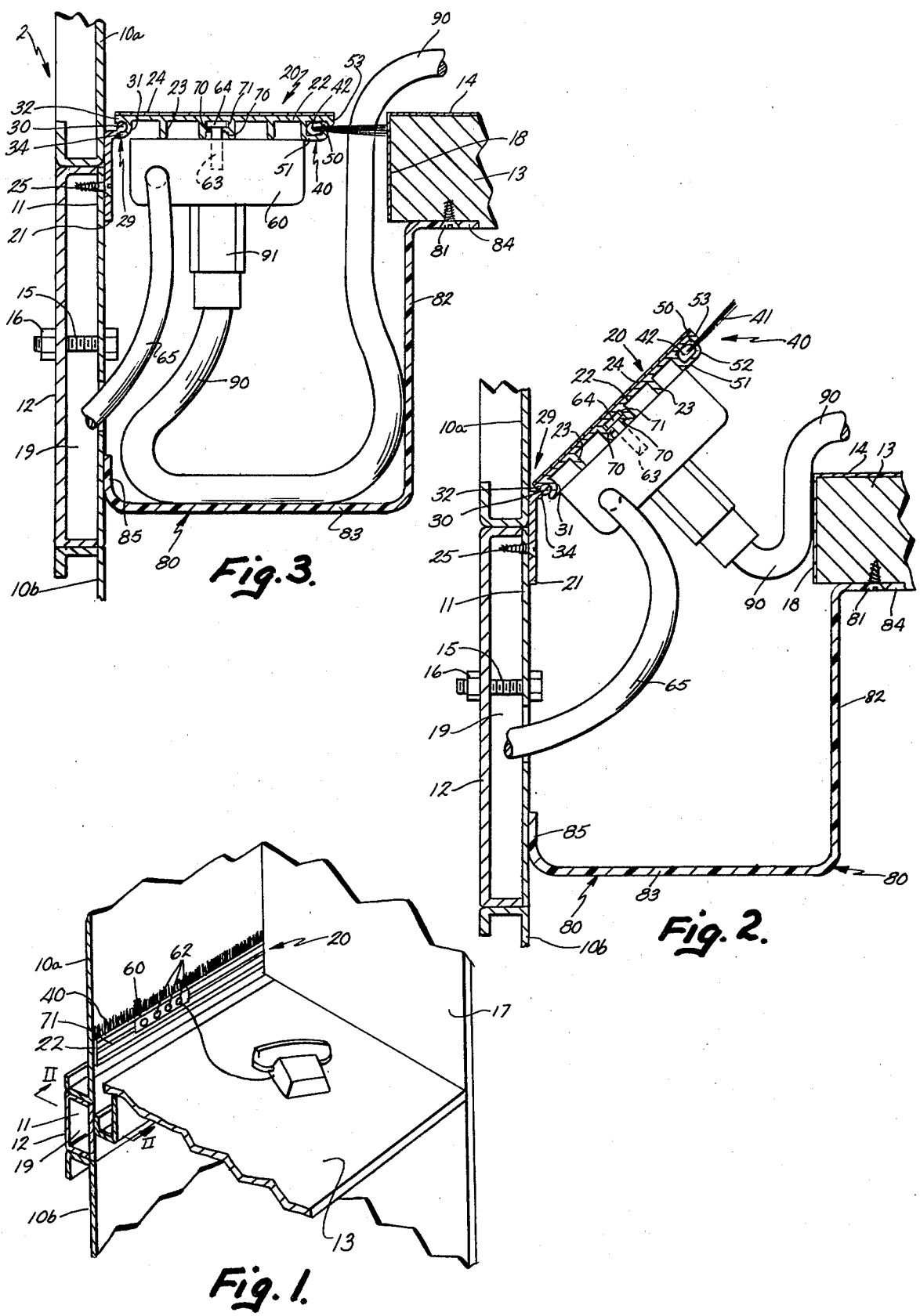

COMBINATION WIRE ENCLOSURE AND WIRE

BACKGROUND OF THE INVENTION

1. Field of the Invention

The present invention relates to wire enclosures and, more particularly, to a furniture assembly wire enclosure having a cover which is generally flush with the surface of the furniture.

2. Description of the Prior Art

As evidenced by the scope of the prior art, a need currently exists for an aesthetically pleasing, flexibly covered wire enclosure for furniture assemblies so that the interior of the wire enclosure cannot normally be seen while wires can still pass through the flexible cover. The wire enclosure should preferably include easily accessible electrical outlets so that wires passing into the enclosure may be readily connected to a power source.

Although wire enclosures have been designed for use on furniture assemblies, these devices are subject to serious drawbacks. One approach includes an elongated tubular enclosure having both a longitudinal slot through which wires can be passed and a flexible plastic strip covering the slot. The enclosure is secured to the rear edge of the desk top so that the opening extends above the desk top and faces forward. An example is Wolff et al. 4,094,561. This device has several disadvantages. First, because the mounted device extends above the desk top, it is unsightly and does not blend in with the desk top. Second, the plastic wiper strip which is used as a cover for the longitudinal slot has a cheap appearance and consequently is unsuitable for installation on high quality furniture. Third, absolutely no provision is made for connecting wires within the enclosure to a power source. Consequently, electrical connections would have to be made with a power source away from the desk top.

Another approach is to construct a desk having a wire enclosure integrally incorporated therein. An example, showing this construction is Konig U.S. Pat. No. 3,883,202. Electrical outlets are located in the bottom of the trough, and a longitudinal slot extends into the trough from the rear edge of the desk top. However, the slot and a portion of the trough extend above the desk top so that the entire assembly has a somewhat unsightly appearance. Second, the enclosure is not covered so that one may easily see into the wire enclosure, adding to the unsightliness of the assembled product. Finally, although electrical outlets are provided in the trough, these outlets are somewhat inaccessible because they are located at the bottom of the trough. One accessing the outlets would have to lean over the entire desk top in order to look downwardly into the trough to make electrical connections.

Recognizing the problems and drawbacks of the prior art, applicant has conceived that a wire enclosure for a furniture assembly should be constructed so as to be flush with any exterior surfaces of the assembly. Such a wire enclosure would be unobtrusive and would not detract from the overall appearance of the furniture. Second, any slot extending into the wire enclosure should be covered with an aesthetically pleasing, flexible cover. The interior of the wire enclosure assembly could not normally be seen, but wires could still be passed through the cover. The cover should blend in with the furniture surface. Finally, the enclosure should include an easily accessible power source connection so that wires in the enclosure may be readily connected to the power source.

SUMMARY OF THE INVENTION

The prior art problems are solved by the present invention wherein a wire enclosure including a wire raceway and flexibly sealed cover may be mounted within and about a slot passing through a furniture assembly. The slot opens on both a relatively unexposed surface and a relatively exposed surface of the assembly. The wire raceway is located adjacent the unexposed opening of the slot, while the cover is secured over the exposed opening.

In one aspect of the invention the cover is hingedly mounted to one side of the slot and is flexibly sealed against the other side of the slot. Electrical outlets are mounted on the underside of the cover so that the outlets are hidden when the cover is closed and easily accessible (i.e., out of the slot) when the cover is open. This wire enclosure overcomes drawbacks of the prior art. It is covered so that the interior of the enclosure is normally hidden. However, the cover is at least partially flexible allowing wires to pass therethrough. Second, the cover is generally flush with the exterior surface providing an aesthetically pleasing appearance. Finally, the electrical outlets mounted on the underside of the cover provide an easily accessible power source for wires running into the enclosure.

An alternative embodiment of the wire enclosure includes the wire raceway and a brush for flexibly covering the slot extending therein. Although brushes have been used as sealing devices in other art fields such as windows (Collins U.S. Pat. No. 4,037,378 and Douglas U.S. Pat. No. 4,195,681) and animal exits (Novitz U.S. Pat. No. 2,778,417), brushes have not been used as a sealing means for wire enclosures or indeed furniture assembly components of any type. A brush cover enables the wire enclosure to be sealed in an aesthetically pleasing manner. The brush provides a richer look than other types of sealing means such as plastic strips.

These and other objects, advantages, and features of the invention will be more fully understood and appreciated by reference to the written specification and appended drawings.

BRIEF DESCRIPTION OF THE DRAWNGS

FIG. 1 is a fragmentary perspective view of a modular furniture assembly with the wire enclosure installed and the cover fully open;

FIG. 2 is a fragmentary cross-sectional view taken along line II—II of FIG. 1 with the cover partially open;

FIG. 3 is a fragmentary cross-sectional view similar to FIG. 2 with the cover fully closed;

DESCRIPTION OF THE PREFERRED EMBODIMENT

Figure 5:
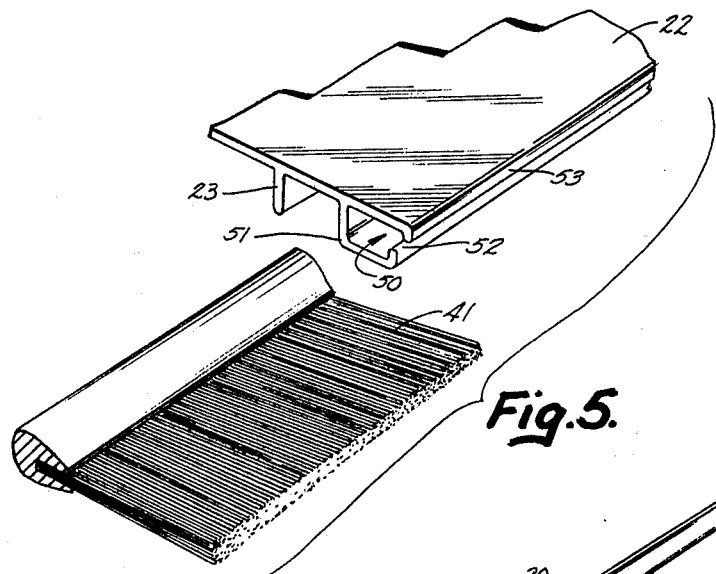
FIG. 5 is a partial, enlarged, perspective view of the cover hinge used in this invention.

One environment in which the wire enclosure of the invention may be used is a modular furniture assembly as shown in FIG. 1. This assembly is of the type which includes two side panels, one identified by reference numeral 17 and the other not shown. Between these side panels is mounted a working surface or desk top 13. A rear panel structure 2 formed by upper and lower panels 10a and 10b and an energy core housing 12, to be described hereinafter, extend between the side panels at the rear of desk top 13. This rear panel structure 2 is supported by a wall panel support structure (not shown) of the type disclosed in copending application Ser. No. 205,734, filed Nov. 10, 1980, and entitled PANEL CONSTRUCTION SYSTEM WITH TUBULAR SUPPORT MEANS.

The wire enclosure 1 of this invention is mounted at the rear portion of the desk top 13 between the rear edge 18 of desk top 13 and the rear panel structure 2. This assembly includes the raceway or well 80 mounted under but between the opening or slot formed between the rear edge 18 and the panels, a cover assembly 20 pivotally mounted on the rear panel structure 2, and the energy core housing 12 in which the electrical means for supplying power to the cover assembly 20, as will be disclosed hereinafter, is located.

Cover assembly 20 includes hinge plate 21, cover 22, and brush 40 secured to the free edge of cover 22, and the outlet assembly 60. Plate 21 is secured to either upper panel 10a or cover plate 11 using hinge screws 25 so that plate 21 is located substantially opposite rear edge 18. Hingedly mounted to plate 21 is cover 22. Ribs 23 run the full length of the underside of cover 22 to provide additional strength. Both hinge plate 21 and cover 22 are preferably extruded from aluminum. Cover veneer 24 is applied to the upper surface of cover 22 and selected to match desk veneer 14 so that a coordinated appearance is achieved.

Hinge 29, shown in more detail in FIG. 5 is continuous and runs the full length of cover 22. The male portion of hinge 29 comprises bulbous flange 30 which extends outwardly and upwardly from hinge plate 21. Bulbous flange 30 is bulb-shaped in cross section with the enlarged portion of the bulb providing the hinge axis. Cover 22 is hingedly mounted on bulbous flange 30 by the combination of raised rear edge 32 and hinge flange 31 which extend away from cover 22 and around bulbous flange 30. Movement of cover 22 is stopped in the upward direction when rear raised edge 32 abuts upper mounted plate surface 33 and in the downward direction when hinge flange 31 abuts forward mounted plate surface 34.

Brush 40 extends along substantially the entire length of cover 22. It comprises a plurality of bristles 41 secured in a brush-like arrangement by pinch plate 42. Pinch plate 42 is an elongated member made of a pliable material and generally U-shaped in cross section. Bristles 41 are secured by placing bristles 41 within U-shaped pinch plate 42 and clamping same shut entrapping bristles 41. This brush is similar to brushes formed on the beater bar of a vacuum. Bristles 41 engage rear edge 18 when cover 22 is completely closed, as shown in FIG. 3.

Figure 6:
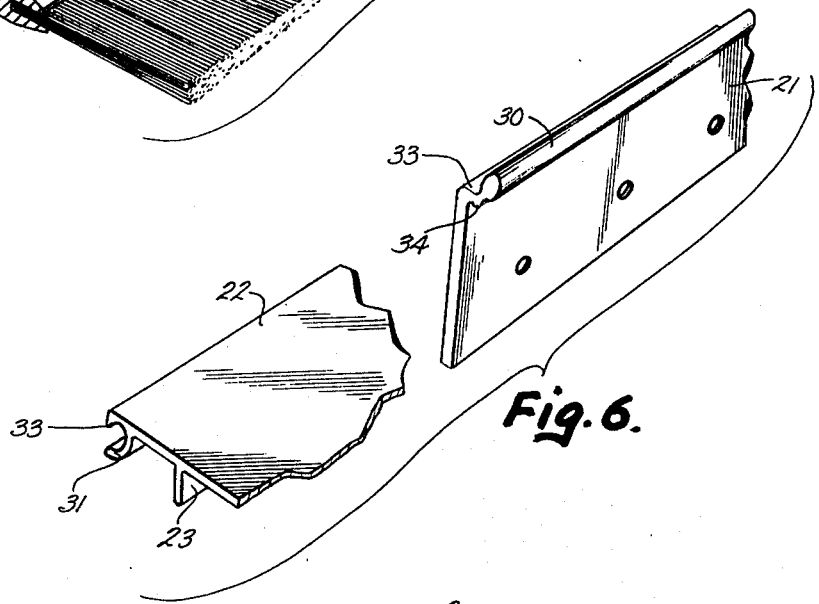
FIG. 6 is a partial, enlarged, perspective of the structure for mounting the bristles on the cover.

As best disclosed in FIG. 6, brush 40 is mounted on cover 22 within brush channel 50 which runs substantially the entire length of cover 22. Brush channel 50 is defined by flange 53 which extends forwardly and then downwardly from cover 22 and flange 51 which extends forwardly and then upwardly of cover 22. This provides a channel, the interior of which is wider than the space between retaining edges 52 and 54 of flanges 53, respectfully; whereby brush 40 is retained within channel 50.

Outlet assembly 60 comprises housing 61, outlets 62 located therein, and power cord 65. Outlets 62 are generally of a conventional type providing 110 volt, 60 cycle per second electrical current but within the broader aspects of this invention, lesser or greater power can be provided. Outlets 62 are conventionally wired (not shown) to power cord 65 which extends from housing 61 through mounting plate 11 to a power source connection (not shown) located within energy core 19.

Secured within the upper surface of housing 61 are bolts 63 having bolt heads 64. Bolts 63 extend away from housing 61 so that bolt heads 64 are located somewhat above housing 61.

Outlet assembly 60 is slidably mounted on the undersurface of cover 22 by positioning bolt heads 64 within bolt channel 71 which runs substantially the entire length of the undersurface of cover 22. Bolt channel 71 is defined by any two adjacent ribs 23 and opposing bolt flanges 70 which extend towards each other from said adjacent ribs. Consequently, bolt channel 71 is generally C-shaped in cross section, securing bolt heads 64 therein. When mounted in this manner, outlet assembly 60 may be slid along the full length of cover 22.

The raceway or well 80 formed by flanges 82 and 83 is generally L-shaped in cross section and extends substantially the entire length of desk top 13. Attaching flange 84 extends forwardly from the upper edge of flange 82, and flange 85 extends upwardly from the rear edge of horizontal flange 83. Attaching flange 84 is secured to the undersurface of desk top 13 using screws 81. The exact mounting location is chosen so that flange 85 abuts mounting plate 11. Raceway 80 houses the wires within the enclosure to prevent them from sagging down where they can be seen below desk top 13. Raceway 80 is preferably extruded from plastic.

OPERATION

When one is using an electrical device (not shown) on desk top 13 and desires to connect to a power source, one pulls cover 22 into the fully open position as shown in FIG. 1. Outlet assembly 60 with outlets 62 therein is then easily accessible being located above desk top 13. The user then plugs electrical plug 91 into outlet 62. Cover 22 is then pivoted downwardly into the fully closed position as shown in FIG. 3. As cover 22 is pivoted downwardly, outlet assembly 60 is lowered into the wire enclosure so that both outlet assembly 60 and plug 91 are hidden from view. When cover 22 is fully closed, brush 40 extends from cover 22 to rear edge 18 sealing cover 22 against desk top 13. Desk top 13 and cover 22 comprise a uniform planar surface interrupted only by brush 40. Wire 90 extending from electrical plug 91 passes through brush 40 and onto desk top 13 where the electrical device is located. Any extra or loose wire between the device and brush 40 is then pushed into the wire enclosure to further clean up the appearance of the desk top. Wire 90 may be moved along the entire length of brush 40 with cover 22 fully closed. Therefore, devices may be repositioned on desk top 13 and their associated cords may be slid along brush 40.

A plurality of electrical appliances could be attached in the manner described herein. Furthermore, telephone wires could also be run into the wire enclosure if suitable connection means are provided therein.

MODIFICATION

Figure 4:
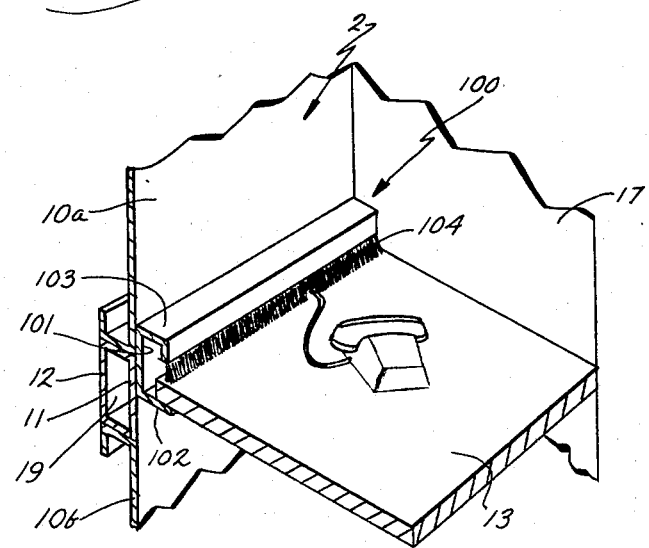
FIG. 4 is a fragmentary perspective view of a modular furniture assembly with an alternative embodiment of the wire enclosure installed.

Within the broader aspects of this invention, an alternative embodiment of the wire enclosure is shown in FIG. 4, where upper and lower panels 10a and 10b, housing 12, cover plate 11, desk top 13 and side panel 17 correspond to their like-numbered counterparts in the previous embodiment.

Wire enclosure 100 extends between the side panels and is mounted on the rear panel structure 2 by securing attaching plate 101 thereto. Desk top flange 102 extends forwardly from the lower edge of attaching plate 101 and engages the undersurface of desk top 13. Extending forwardly and then downwardly from the upper edge of attaching plate 101 is brush support flange 103 which is generally L-shaped in cross section. Brush support flange 103 is located above desk top 13 defining a slot therebetween through and along which wires can extend and be pulled. Finally, brush 104 extends downwardly from brush support flange 103 and engages desk top 13 flexibly covering the slot.

The wire enclosure of the present invention could be mounted within a slot in upper panel 10a and open forwardly. Alternatively, the enclosure could be installed on a desk top or credenza having no adjacent wall panel.

Of course, it is further understood that the above is merely a preferred embodiment of the invention and that various changes and alterations can be made without departing from the spirit and broader aspects of the invention as set forth in the appended claims, which are to be interpreted in accordance with the principles of patent law including the doctrine of equivalents.

The embodiments of the invention in which an exclusive property or privilege is claimed are defined as follows:

1. A wire enclosure assembly for furniture comprising two panel portions spaced from each other and defining a longitudinally extending slot with an outer surface area adjacent said slot, said slot having first and second sides;
    a wire raceway adjacent said slot, and said slot communicating with said raceway and the space outwardly of said surface area; and
    means for flexibly sealing said slot;
    wherein the improvement comprises said sealing means comprising:
    a plurality of flexible bristles in a brush-like configuration extending between said first and second sides and confined inwardly of said surface area, each of said bristles having a mounting end and a free end, a substantial proportion of said free ends being located immediately adjacent said first side;
    means retaining said bristles in said configuration, said mounting ends being secured in said retaining means and said retaining means being located at said second side; and
    said bristles and said retaining means completely covering said slot and permitting a wire extending through said slot to be pulled longitudinally along said slot.

2. The wire enclosure assembly of claim 1 wherein said retaining means comprises an elongated pinch plate generally U-shaped in cross section pinchingly securing said mounting ends of said bristles.

3. The wire enclosure assembly of claim 2 wherein said mounting means comprises a bristle mounting channel running substantially the entire length of said first side of said slot and extending toward said second side, said pinch plate being located within said bristle mounting channel and said bristles extending outwardly therefrom.

4. The wire enclosure assembly of claim 1 or 3 wherein said panel portions of said assembly comprise a desk top and said slot is located in the surface of said desk top.

5. The wire enclosure assembly of claim 1 or 3 wherein said panel portions comprise a wall panel portion and a horizontally mounted panel portion and said slot is located along the exterior surface of said wall panel between said wall panel portion and said horizontally mounted panel portion.

6. A wire enclosure assembly including:
    a furniture assembly having a surface with a slot extending through a portion thereof, said slot having first and second sides;
    a wire raceway adjacent said slot, said slot communicating with said raceway; and
    means for covering said slot;
    wherein the improvement comprises said covering means comprising:
    a generally rectangulary shaped, planar cover member having first and second edges, said cover member mounted in said slot with the distance between said first and second edges being less than the distance between said first and second sides thereby providing a space between said second edge and said second side of said slot through and along which an electrical wire can extend and be pulled;
    said cover member being removable to provide access into said raceway; and
    a flexible cover means flexibly covering the said space between said second edge and said second side of said slot whereby a wire can be pulled through and along said opening when the said cover is in closed position.

7. The wire enclosure assembly of claim 6 wherein said cover member is hingedly mounted by said first edge to said first side of said slot and can pivot outwardly from said slot and further comprising means preventing said cover member from pivoting beyond a closed position within said slot wherein said cover member is generally flush with said surface of said furniture assembly.

8. The wire enclosure assembly of claims 6 or 7 further comprising:
    an electrical connecting means; and
    first means mounting said electrical connecting means on an undersurface of said cover member, said undersurface facing into said slot when said cover member is in said closed position and facing outwardly for access when said cover is in open position.

9. The wire enclosure assembly of claim 8 wherein said first mounting means permits said electrical connecting means to slide lengthwise along said undersurface of said cover member.

10. The wire enclosure assembly of claim 9 wherein said first mounting means comprises:
    a support member having a channel running substantially the full length of and extending laterally away from said undersurface of said cover member, said channel providing a track; and
    a shaft mounted on said electrical connecting means and having a head mounted thereon, said head located and supported within said track for sliding movement in said channel.

11. The wire enclosure assembly of claims 6, 7, 9 or 10 wherein said flexible sealing means comprises:
   a plurality of bristles in a brush-like configuration, each of said bristles having a mounting end and a free end, a substantial proportion of said free ends being located immediately adjacent said second side of said slot;
   means retaining said bristles in said configuration, said mounting ends being secured in said retaining means and said retaining means being located at said second edge of said cover.

12. The wire enclosure assembly of claim 11 wherein said retaining means comprises an elongated pinch plate generally U-shaped in cross section pinchingly securing said mounting ends of said bristles.

13. The wire enclosure assembly of claim 12 wherein said second mounting means comprises a bristle mounting channel running substantially the entire length of said second edge of said cover member and extending toward said second side of said slot when said cover is in said closed position, said pinch plate being located within said bristle mounting and said bristles extending outwardly therefrom.

* * * * *

UNITED STATES PATENT AND TRADEMARK OFFICE

Certificate

Patent No. 4,372,629            Patented February 8, 1983

Paul L. Propst, Donald A. Richardson and Carl B. Hinrichs

Application having been made by Paul L. Propst, Donald A. Richardson, and Carl B. Hinrichs, the inventors named in the patent above identified, and Stow and Davis Furniture Co., the assignee, for the issuance of a certificate under the provisions of Title 35, Section 256, of the United States Code, adding the name of Robert L. Russell as a joint inventor, and a showing and proof of facts satisfying the requirements of the said section having been submitted, it is this 26th day of November, 1985, certified that the name of the said Robert L. Russell is hereby added to the said patent as a joint inventor with the said Paul L. Propst, Donald A. Richardson, and Carl B. Hinrichs.

FRED W. SHERLING,
*Associate Solicitor.*